No. 696,162. Patented Mar. 25, 1902.
J. S. CALLEN.
CRUSHED ICE HOLDER.
(Application filed July 25, 1901.)
(No Model.)
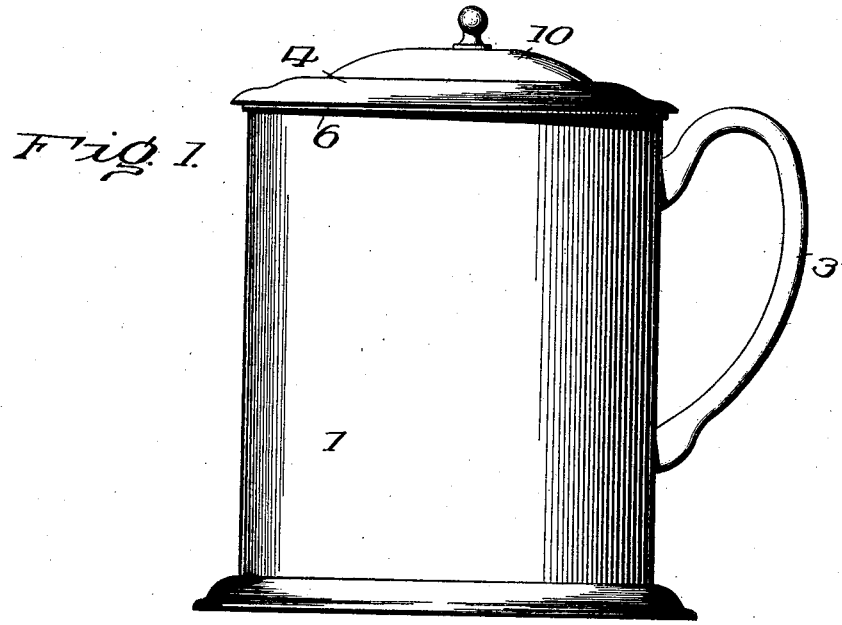
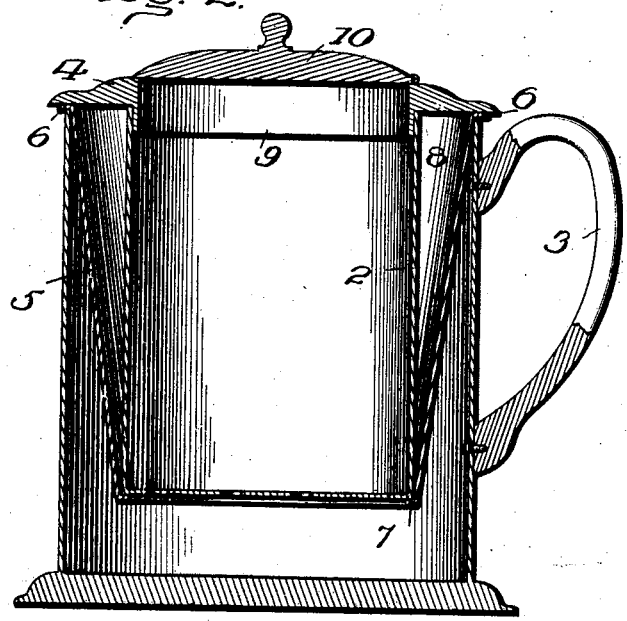
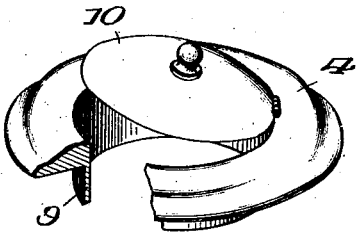
Inventor
J. Spencer Callen.

UNITED STATES PATENT OFFICE.

JOSEPH S. CALLEN, OF SHENANDOAH, PENNSYLVANIA.

CRUSHED-ICE HOLDER.

SPECIFICATION forming part of Letters Patent No. 696,162, dated March 25, 1902.

Application filed July 25, 1901. Serial No. 69,691. (No model.)

*To all whom it may concern:*

Be it known that I, JOSEPH S. CALLEN, a citizen of the United States, residing at Shenandoah, in the county of Schuylkill and State of Pennsylvania, have invented certain new and useful Improvements in Crushed-Ice Holders; and I do hereby declare the following to be a full, clear, and exact description of the invention, such as will enable others skilled in the art to which it appertains to make and use the same.

This invention has relation to a vessel primarily intended for holding crushed ice, although capable of receiving any article to be kept free from excessive liquid, since provision is had for draining off the same.

The vessel consists of an inner and an outer receptacle, the inner receptacle having a perforate bottom for the escape of drippings or fluid of any kind and the outer receptacle catching and holding the drippings or fluid. The two receptacles are spaced, and an annular cover closes the space at its upper end. A second cover closes the inner receptacle and is supported by the annular cover. A conicocylindrical shell supports and centralizes the inner receptacle within the outer receptacle and in conjunction with the said inner receptacle forms a compartment for the reception of a chemical or desired medium.

The invention will be more particularly set forth hereinafter, claimed, and illustrated in the drawings hereto attached, in which—

Figure 1 is a side view of a vessel embodying the invention, the hinged cover being opened part way. Fig. 2 is a vertical central section. Fig. 3 is a detail perspective view of the two covers, a portion of the annular cover being broken away.

Corresponding and like parts are referred to in the following description and indicated in all the views of the drawings by the same reference characters.

In its general appearance the vessel may be of any construction, form, and size and comprises an outer receptacle 1 and an inner receptacle 2 of less depth and diameter, so as to leave a space between the sides and bottoms of the two receptacles when properly positioned. The manner of forming the receptacles and the nature of the material entering into their construction are unimportant features within the spirit of the invention, since metal, porcelain, earthenware, and the like or any combination of these materials may be utilized, as desired. The bottom of the inner receptacle is perforated for the escape of drippings or liquid of any kind, the outer receptacle catching and holding the said drippings. For convenience the outer receptacle is provided with a handle 3. The receptacle 2 may be supported within the receptacle 1 in any desired way, it being essential that the upper ends of the two receptacles lie in the same plane, so as to touch the lower side of the annular cover 4, which closes the upper end of the annular space formed between the sides or walls of the receptacles 1 and 2.

While, as stated, it is contemplated to support the receptacle 2 within the receptacle 1 in any desired way, yet the means shown is preferred, since the compartment intermediate of the walls of the two receptacles is formed. The supporting means consists of a shell 5 of conicocylindrical form and arranged with its smaller end lowermost. This shell has an outer flange 6 at its upper end to overlap the top edge of the receptacle 1 and is provided at its lower end with an inner flange 7, which underlaps the receptacle 2 and forms a support therefor. The upper end of the shell 5 fits snugly within the receptacle 1, and the receptacle 2 fits snugly within its lower end. Hence there is no chance for lateral play of the parts 5 and 2. The compartment 8, formed between the shell 5 and walls of the receptacle 2, flares upwardly and is adapted to receive a chemical or any substance desired to be placed therein. This compartment 8 can be readily cleaned because of the detachability of the parts 5 and 2. The space between the shell 5 and the walls of the receptacle 1 constitutes an air and drip compartment.

The annular cover 4 is made heavy and closes the space formed between the walls of the two receptacles and rests upon the upper edges thereof. A rim or flange 9, pendent from the inner wall of the cover 4, enters the upper end of the receptacle 2 and prevents lateral displacement of the cover and insures a close joint between the said cover and the receptacle 2, whereby intermixing of the contents of the compartment 8 and receptacle 2 is wholly obviated. A second cover 10 closes the receptacle 2 and the space circumscribed by the cover 4. This cover 10 is by preference hinged to the cover 4 and is to swing open and shut, as indicated in Fig. 1.

When assembling the parts, the receptacle 2 may be placed in the shell 5 preliminary to lowering said shell into the receptacle 1, or the said shell may be fitted into the receptacle 1 and the receptacle 2 subsequently placed in position. The cover 4 is placed in position after the parts 5 and 2 have been properly assembled, when the vessel or holder is ready for use. Crushed ice placed in the receptacle 2 will not melt away quickly because of the space surrounding the said receptacle and because drippings readily find an escape through the perforations in the bottom of the receptacle 2. Hence the ice may be kept in serviceable condition for a long time.

Having thus described the invention, what is claimed as new is—

1. A crushed-ice holder or vessel comprising inner and outer receptacles spaced apart, the inner receptacle having a perforate bottom, an annular cover closing the upper end of the space formed between the walls of the two receptacles and having a rim or flange pendent from the inner walls to enter the upper end of the inner receptacle, and a second cover closing the inner receptacle and the space circumscribed by the annular cover, substantially as set forth.

2. A crushed-ice holder or vessel comprising inner and outer receptacles, the inner receptacle having a perforate bottom, a shell suspending the inner receptacle within the outer receptacle and subdividing the space between the walls of the two receptacles into inner and outer compartments, an annular cover closing the space formed between the walls of the two receptacles, and a second cover fitted to the annular cover for closing the inner receptacle, substantially as set forth.

3. A crushed-ice holder or vessel comprising an outer receptacle, an upwardly-flaring shell having an outer flange to rest upon the top edge of the said receptacle and having an inner flange at its lower end, an inner receptacle supported by the said inner flange, and a cover for closing the said holder or vessel, substantially as set forth.

4. A crushed-ice holder or vessel comprising an outer receptacle, an upwardly-flaring shell having an outer flange at its upper end to rest upon the top edge of the said receptacle and having an inner flange at its lower end, an inner receptacle having a perforate bottom and resting upon the said inner flange of the shell, an annular cover closing the space formed between the walls of the two receptacles and having a pendent flange to enter the upper end of the inner receptacle, and a second cover fitted to the annular cover, substantially as set forth.

In testimony whereof I affix my signature in presence of two witnesses.

JOSEPH S. CALLEN. [L. S.]

Witnesses:
R. J. ROWSE,
GEORGE ROWSE.